No. 820,389. PATENTED MAY 15, 1906.
T. M. CASE.
FLY TRAP.
APPLICATION FILED SEPT. 22, 1905.

Witnesses
Inventor
T. M. Case

UNITED STATES PATENT OFFICE.

THOMAS M. CASE, OF SUTHERLAND, MISSOURI.

FLY-TRAP.

No. 820,389.      Specification of Letters Patent.      Patented May 15, 1906.

Application filed September 22, 1905. Serial No. 279,665.

*To all whom it may concern:*

Be it known that I, THOMAS M. CASE, a citizen of the United States, residing at Sutherland, in the county of Johnson and State of Missouri, have invented certain new and useful Improvements in Fly-Traps, of which the following is a specification.

The object of my invention is to provide a novel construction of fly-trap which will have few and simple parts, that can be cheaply and easily constructed and assembled, which will operate in an effective manner to catch and destroy flies and other insects, and which will be provided with parts that can be readily and conveniently removed for cleansing or other purposes, all as hereinafter more fully described and claimed.

For a full description of the invention and the merits thereof and also to acquire a knowledge of the details of construction of the means for effecting the result reference is to be had to the following description and accompanying drawings, in which—

Figure 1:
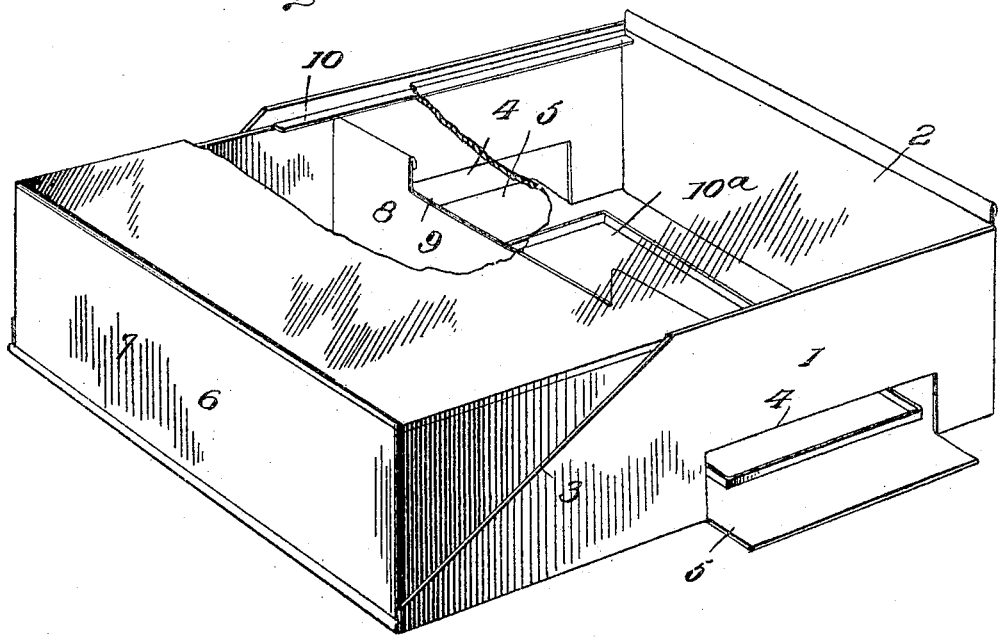
Figure 2:
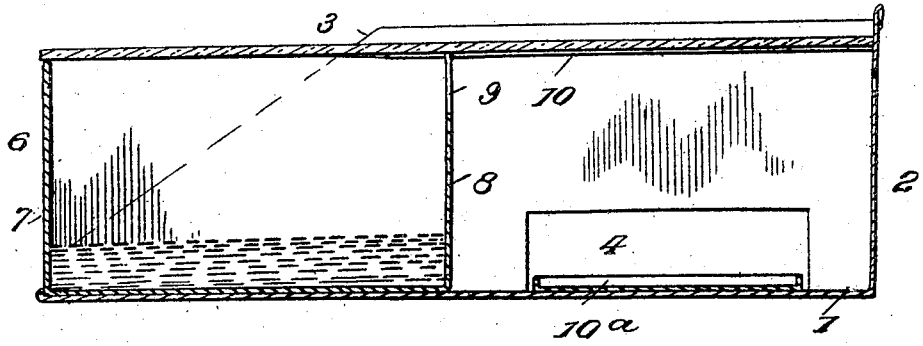

Figure 1 is a perspective view of my improved fly-trap with part broken away to better disclose the invention. Fig. 2 is a longitudinal section.

Referring to the drawings, 1 indicates a casing, which may be of any desired size or shape and any suitable material, in the present instance being shown substantially rectangular in form. The one end of the casing 1 is preferably permanently closed, while the other end is preferably open, as shown, the sides 3 tapering toward such latter end, as indicated. Near the closed end of the casing the latter is provided in one or both sides with openings into which preferably horizontal ledges 5 lead, said ledges being formed in the present instance of the material bounded by the cut necessitated in forming the openings 4. These openings 4 constitute the entrances for the flies to gain access to the interior of the casing. Within the open end of the casing is removably set in a transversely-disposed position a box 6, extending from side to side of the casing, the outer wall 7 of said box practically constituting an end for the casing and the other wall 8 practically constituting a partition dividing the casing into two compartments, one of which in the box 6 and the other that portion of the casing which is provided with the entrance-openings 4. The partition 8 is provided at its upper edge with a preferably shallow recess 9, which establishes communication between the two said compartments. Within the compartment containing the entrance-openings 4 is set a shallow pan $10^a$, designed to contain sorghum-molasses or some similar substance to attract the flies, and said pan is preferably made relatively large with respect to the bottom area of the compartment, though sufficiently narrow to permit of its being inserted through and withdrawn from either of the openings 4 when it is desired to wash the pan or replenish its supply. The sides of the casing 1 are provided near their upper edges with inwardly-extending flanges 10, forming ledges upon which a cover of glass or other similarly transparent material rests, said cover extending over and forming a closed top for the entire casing. The flanges 10 preferably extend over the box 6 in contact with the upper edge thereof, thereby forming guiding and retaining devices for the box, so that the casing may be carried from place to place without the displacement of the box. The latter is preferably slid into and out of the casing, and it is intended to contain a supply of water, preferably soapy water, or some other liquid insecticide to kill the flies. The flies being attracted by the contents of the pan will enter the casing through the opening 4, and after having their fill will naturally fly upwardly, being attracted by the light. Also naturally seeking an outlet along the translucent cover instead of out through the darker openings 4 they will find their way through the recess 9 into the other compartment, where in their efforts to escape and the consequent flying against the cover and then away from the same they will fall into the contents of the box and be destroyed. The said box may be readily withdrawn to empty and then returned.

A device constructed according to my invention, even if of small area, will kill a considerable number of flies without any attention and will go far in ridding places of these pests.

Having thus described the invention, what is claimed as new is—

1. A fly-trap comprising a casing having one end closed and provided in its sides near said end with entrance-openings, a box in said casing and extending from side to side thereof, the outer wall of said box constituting the other end of the casing and the inner wall of said box constituting a partition dividing the casing into compartments and said partition formed in its upper edge with a recess establishing communication between said compartments, and a pan removably disposed in the compartment which contains the entrance-openings and designed to receive a supply of food, the box or other compartment being designed to receive an insecticide.

2. A fly-trap comprising a casing closed at one end and provided near said end with entrance-openings, the other end of said casing being open, a box designed to be slid into and out of the open end of said casing, the outer walls of said box constituting the other end of said casing and the inner walls of the box constituting a partition dividing the casing into two compartments, and said partition being formed in its upper edge with a shallow recess establishing communication between the compartments, a food-pan located in one of said compartments and the other being designed to receive an insecticide, and a translucent cover forming a top for both of said compartments.

3. A fly-trap comprising a casing provided at its upper edge with inwardly-extending flanges, a translucent cover for said casing resting upon said flanges, and a box slidably held in the casing with its upper edges engaging under the said flanges whereby it is retained in position, said box dividing the casing into two compartments of which one is constituted by the box, there being provided entrance-openings in the other compartment and a recess in one wall of the box establishing communication between the two compartments.

In testimony whereof I affix my signature in presence of two witnesses.

THOMAS M. CASE. [L. S.]

Witnesses:
 WALTER WARREN,
 ALPHA SILVER.